United States Patent [19]

White

[11] Patent Number: 4,498,778
[45] Date of Patent: Feb. 12, 1985

[54] HIGH SPEED SCANNING METHOD AND APPARATUS

[75] Inventor: Steven J. White, Seattle, Wash.

[73] Assignee: Technical Arts Corporation, Seattle, Wash.

[21] Appl. No.: 426,840

[22] Filed: Sep. 29, 1982

Related U.S. Application Data

[63] Continuation-in-part of Ser. No. 249,131, Mar. 30, 1981, abandoned.

[51] Int. Cl.³ .................... G01B 11/24; G01C 25/00; H04N 7/02
[52] U.S. Cl. .................................. 356/376; 358/107; 364/571
[58] Field of Search .................. 356/1, 371, 375–376, 356/381, 387, 394; 358/107, 139, 903; 364/571, 550, 559–560, 570, 579, 829–830, 834; 250/560

[56] References Cited

U.S. PATENT DOCUMENTS

| | | | |
|---|---|---|---|
| 3,803,394 | 4/1974 | Fraser | 364/830 |
| 3,895,870 | 7/1975 | Cullen et al. | 356/1 |
| 3,947,130 | 3/1976 | Procter | 356/387 |
| 4,017,721 | 4/1977 | Michaud | 358/903 |
| 4,041,286 | 8/1977 | Sanford | 358/139 |
| 4,188,544 | 2/1980 | Chasson | 356/376 |
| 4,219,847 | 8/1980 | Pinkney et al. | 364/559 |
| 4,379,308 | 4/1983 | Kosmowski et al. | 356/394 |

OTHER PUBLICATIONS

Moore et al., "Electron Beam Measurement with On-Line Calibration", IBM Tech. Disc. Bull. 6-1979, pp. 104–105.
Will, P. M. "Optical Encoding of 3-Dimensional Objects", IBM Tech. Disc. Bull. 2-1974, pp. 3117–3118.
Gusev, Y. A. "Method & Circuit for Finding the Coordinate of the Center of a Particle Track on a Scanning Automation", Instruments & Exp. Techniques, Nov.–Dec. 1975, pp. 1761–1763.

Primary Examiner—William H. Punter
Attorney, Agent, or Firm—Christensen, O'Connor, Johnson & Kindness

[57] ABSTRACT

A method and apparatus for determining the spatial coordinates of a workpiece including: a precisely formed jig; a planar light source; an electronic imaging device adapted to view the intersection of the planar light with the jig and the workpiece; a video digitizer for sampling and digitizing output signals from the imaging device and in particular reference pulse signals representative of said intersections; digital logic circuitry for algebraically summing video samples to determine the centroid or geometric mean of the reference pulses; and a computer for calculating calibration parameters based on knowledge of the form of the jig and scans of the jig, and applying those calibration parameters to scans of the workpiece to calculate spatial coordinates of the workpiece. A method of determining the centroid of a sensed pulse signal including the steps of integrating the signal over a selected interval including the pulse by analog or digital means, integrating the result of the first integration in like manner and dividing result of the second integration by the result of the first integration.

28 Claims, 13 Drawing Figures

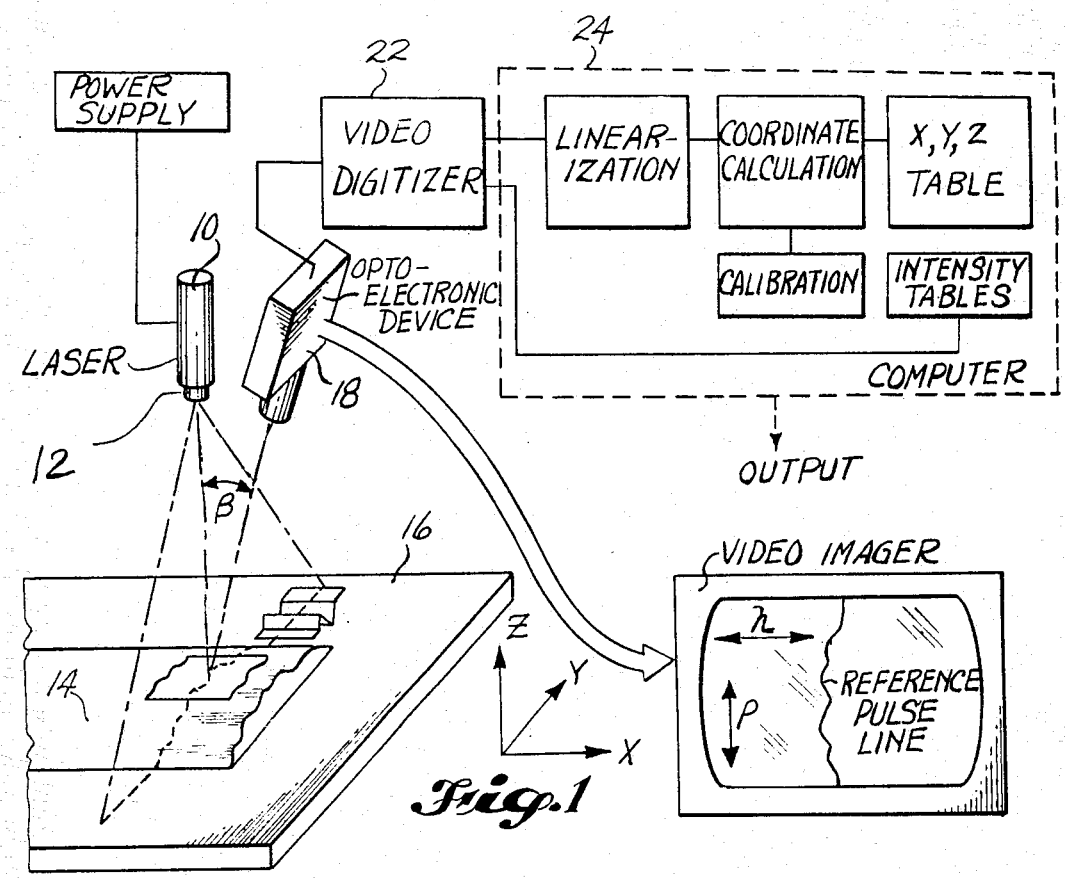
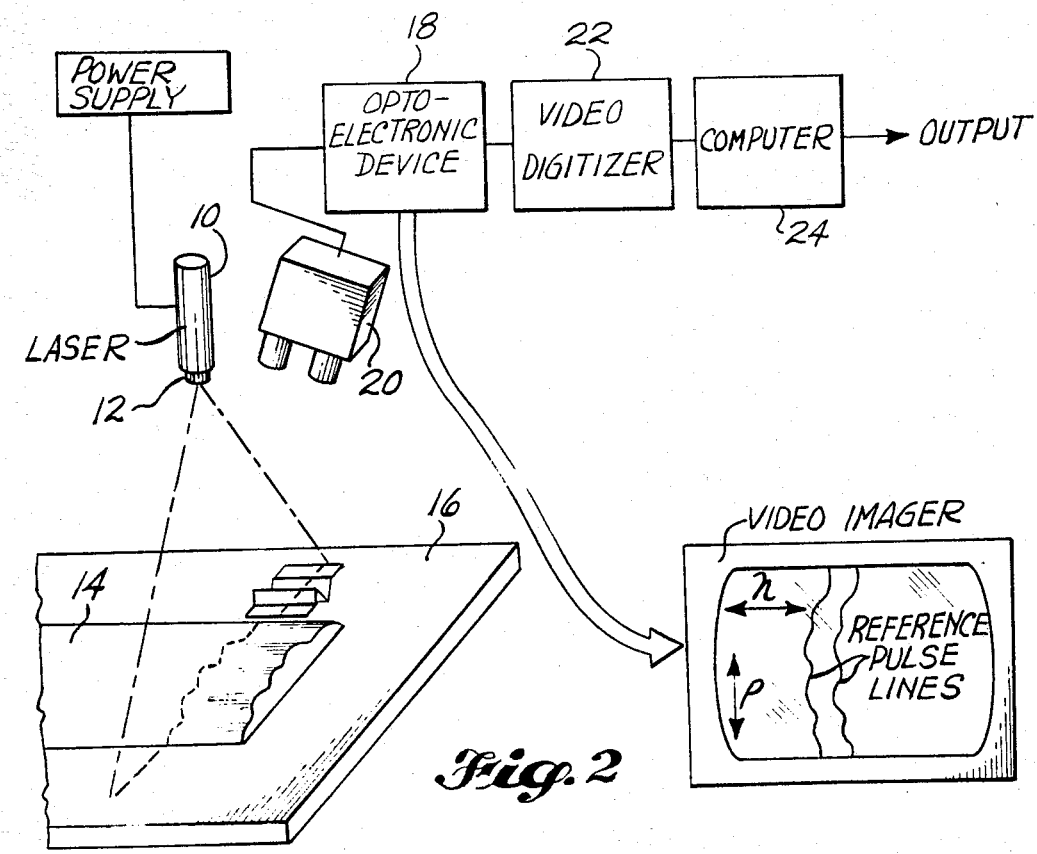

HIGH SPEED SCANNING METHOD AND APPARATUS

This application is a continuation-in-part of application Ser. No. 249,131, filed Mar. 30, 1981, now abandoned.

DESCRIPTION

1. Field of the Invention

The present invention relates, in general, to an improved method of determining the location of a sensed electronic pulse, and further to a method and apparatus for determining the spatial coordinates of a workpiece within the field of view of the apparatus, and in particular, to a device capable of providing the spatial coordinates of a viewed workpiece faster and more accurately than known devices.

2. Background Art

Apparatus capable of viewing a workpiece, determining its location, and directing equipment to operate upon the workpiece is known. In the past, however, such equipments were often slow and produced results of poor quality due to practical limitations in the cameras and laser scan used. U.S. Pat. No. 4,188,544, for example, discloses equipment designed for use in the lumber industry wherein logs are scanned by projecting a planar light source on a workpiece and detecting the intersection line of the plane of light and the workpiece by means of a television vidicon camera. A calibration technique for modifying the signals generated by the equipment is disclosed wherein a memory unit is used to store calibration information derived by comparing scanning signals of a known three-dimensional reference piece located in the field of view of the camera with previously stored spatial coordinates of the known reference piece. Measurements are made by comparing the workpiece scan with the information derived from the calibration scan. In this prior art system, only the stored spatial coordinates are used for calibration calculations. Thus, the disclosed equipment is limited in its resolution power to the number and accuracy of the stored spatial coordinates and the ability to accurately locate the corresponding spatial coordinates during the calibration scan.

Another system employing a coherent light beam impinged on a workpiece surface and then viewed by a vidicon camera is disclosed in U.S. Pat. Nos. 3,895,870 and 3,796,492. These patents employ either a single punctiform beam and a pair of viewing parts or a single viewing location and a pair of punctiform beams to determine the distance from the camera to the object struck by the beam. In short, the patents merely disclose a distance meter.

U.S. Pat. No. 4,111,557 discloses a method for optically determining and comparing the shapes and positions of objects. Again, objects are viewed by an opto-electronic receiving device and then converted into electric pulses which, after analog-digital conversion, are stored and coordinated with spatial coordinates. The stored data is then compared with the data of an ideal or real object to determine variations in shape or position. This invention does not even attempt to determine spatial coordinates, but merely relates to changes in shape.

U.S. Pat. No. 4,146,926 also employs a punctiform beam and a pair of reflected light gathering means to explore the surface of a body and determine the location thereof with respect to a reference point.

U.S. Pat. Nos. 4,115,806 and 3,980,812 are considered to be of lesser relevance in that they disclose methods of analyzing electronic images different from that employed in the present invention.

U.S. Pat. No. 4,126,395 discloses a method of determining the location of points on a specular surface having spatial location indicia thereon.

Other prior art systems using non-coherent light sources and photocell sensors are shown in U.S. Pat. Nos. 3,459,246; 3,736,968; 3,787,700; and 3,963,938. U.S. Pat. No. 3,773,422 discloses a system employing a television camera and laser light source for calculating the dimensions of an object using known distances and geometric relationships.

Patents disclosing systems for determining the surface contour of an object by viewing the object at an angle from an illuminating light beam are shown in U.S. Pat. Nos. 3,187,185; 3,590,258; and 3,625,618.

Prior art systems employing television-type sensors and video digitizers have suffered from accuracy problems in determining the location of sensed pulses. No use of the method disclosed herein for determining the centroid of a pulse is known. The present invention also provides an improved calibration technique for accurately locating the spatial coordinates of a workpiece.

SUMMARY OF THE INVENTION

The present invention discloses a method and apparatus for locating the centroid of a pulse and a method and apparatus employing this method or a pulse integration technique for determining the spatial coordinates of a workpiece. The method includes the steps of illuminating the workpiece with a source of coherent light. An image of the workpiece, including the line of intersection of the coherent light with the workpiece, is formed using an opto-electronic device such as an image orthicon tube, or the like, employing an interference filter and lens of known type. The opto-electronic device views the workpiece at a defined angle from the source of coherent light. The intersection of the plane of coherent light and the workpiece produces a reference pulse on each horizontal line of the image orthicon tube. The location of each pulse, including specifically its geometric mean or centroid, is determined.

Two pulse location techniques are disclosed and may be used. In the first, referred to generally as the "pulse integration technique", the signal from the opto-electronic device is first sampled and digitized. Then, pulse integration is performed by: summing all samples representative of the pulse; doubling and effectively subtracting the doubled sample values successively from the first sample (or from the last sample) until the sum passes through zero; noting the base sample, i.e., the sample which when doubled and effectively substracted from the sum caused the zero transition; calculating the ratio of the value by which zero was exceeded to twice the value of the base sample; and adding the ratio to (or substracting the ratio from) the base sample location.

In the second, referred to generally as the "centroid technique", the signal from the opto-electronic device is again sampled and may be digitized. The centroid technique is then performed by: forming a first sum by summing all samples representative of the pulse; forming a second sum by summing the intermediate sums resulting from each sample addition in the immediately preceding sample summing operation; noting the position of the last sample representative of the pulse; subtracting from this position the ratio of the second sum to the first sum to determine the centroid or geometric mean of the pulse. In the preferred forms, both techniques employ digital logic circuitry although the centroid technique may also be performed using analog integrators.

The spatial coordinates of a workpiece are determined using the geometric mean or centroid of the reference pulses determined as just described together with the angular and distance relationships between the source of coherent light, the workpiece, and the lens of the opto-electronic device determined by a unique method of calibrating the equipment.

The calibration technique employs the placement of a precisely shaped jig in the viewing field of the opto-electronic device. A geometric figure, such as a triangle, typically different in shape than the cross section of the jig, is inherently defined by the jig. The dimensions of the geometric figure, rather than the spatial coordinates of the jig, are effectively stored in an associated computer. The shape of the geometric figure is determined by scanning points along planar surfaces of the jig, connecting lines through those points, and noting the intersections of the lines thus constructed. The intersection points define the corners of the particular geometric figure inherent to the jig. The geometric figure thus constructed in combination with the previously stored dimensions of the figure permit the X, Y and Z spatial coordinates of a workpiece similarly within the viewing field of the opto-electronic device to be calculated with accuracy. It is preferred that the longitudinal axis of the jig be aligned with the horizontal scan lines of the opto-electronic device, however perfect alignment is not necessary.

It is the general object of the present invention to provide an apparatus and method for providing the spatial coordinates of a workpiece.

Another object of the present invention is to provide an appartus and method for determining the spatial coordinates of a workpiece placed within the field of view of the equipment more accurately and rapidly than heretofore known.

A further object of the present invention is to provide an apparatus and method for determining the overall dimensions and visual details of a workpiece having irregular surfaces.

A still further object of the present invention is to provide an apparatus and method for determining the visual detail of workpieces having widely varied optical characteristics.

Another object of the present invention is to provide an apparatus and method which employs a jig of known shape in the field of view of the equipment for use in self-calibrating without storage of the spatial coordinates of the jig.

One more object is to provide a method and apparatus for determining the centroid of a pulse through the use of relatively inexpensive analog or digital logic circuitry such as adders and without need for costly and time-consuming multiplication processes.

These and other features, objects and advantages of the present invention will become more apparent in light of the detailed description of a preferred embodiment of the invention as set forth hereafter and as illustrated in the accompanying drawings.

BRIEF DESCRIPTION OF THE DRAWINGS

FIG. 1 is a block diagram of one embodiment of a typical apparatus for determining the spatial coordinates of a workpiece according to the present invention.

FIG. 2 is a block diagram of another embodiment of a typical apparatus for determining the spatial coordinates of a workpiece employing a camera having a pair of viewing apertures.

DESCRIPTION OF THE PREFERRED EMBODIMENT

Figure 3:
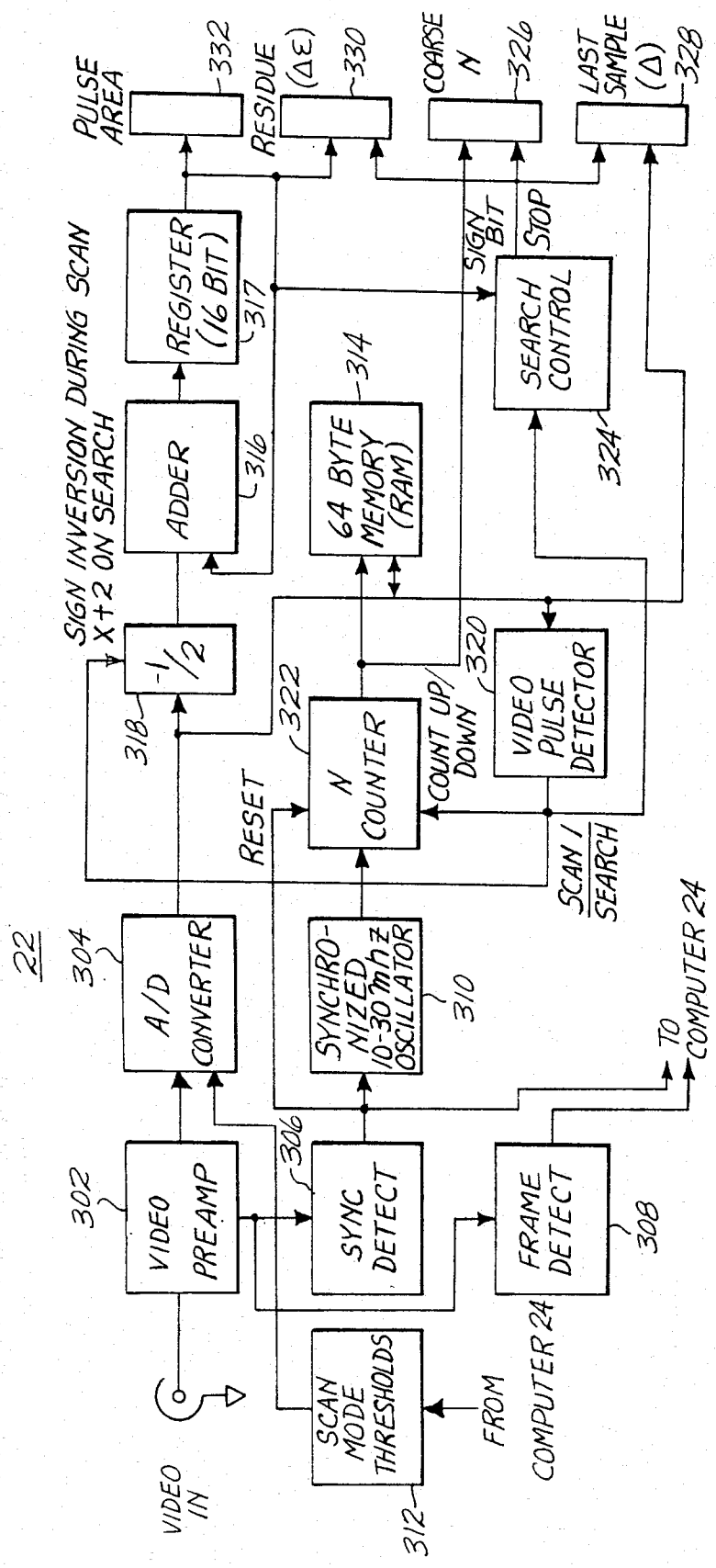
FIG. 3 is a block diagram of a typical video digitizer made according to the present invention.
Figure 4:
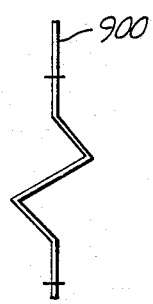
FIG. 4 is a side view of a typical calibration jig which may be used in the present invention.

Referring generally to FIG. 1, a block diagram of one embodiment of a typical apparatus for determining the spatial coordinates of a workpiece is disclosed. A light source of known type, such as a laser or the like having an optical attachment, is used to generate a plane of coherent light which strikes and illuminates a workpiece. As illustrated, the workpiece is shown to be a slab of raw lumber, but it will be understood that the workpiece could be any object whose spatial coordinates are needed to be known in order to allow for accurate measurement, inspection, or processing of the workpiece. Thus, while this invention will be described with specific reference to lumber processing, the equipment is also applicable, without limitation, to industrial control systems, production line inspection, inventory control systems, and medical scanning. Further, the pulse location technique described hereafter may also have wide application outside the lumber processing area.

An imaging tube, such as an orthicon, vidicon or ultracon, views the workpiece from a known and predetermined viewing angle with respect to the planar light source. The imaging tube produces a plurality of scan lines per raster with each scan line having a reference pulse produced thereon which corresponds to the point at which the scan line intersects the plane of coherent light impinging upon and illuminating the workpiece. If viewed on a video imager such as that shown in FIG. 1, the image produced is a reference pulse line formed by the pulses on each scan line. A video digitizer in communication with the output of the imaging tube samples and digitizes the video signals representative of each scan line, including each reference pulse. The digitizer uses the resulting digitized information to determine the location of each reference pulse, and more particularly, the centroid or geometric means of each pulse. The spatial coordinates of the workpiece are subsequently determined by a computer which combines this accurate pulse location information with known information such as the distance of the optical hand from a jig of known shape in the field of view of the optical head and other information determined by the calibration technique described hereafter. The spatial coordinates thus determined may be used by other control computers to control external user devices such as lumber sawing equipment and the like. The user oriented devices do not form a portion of the present invention but it should be understood that the output of this invention is in a form readily usable by control equipment therefore.

An alternate embodiment of the present invention is shown generally in FIG. 2. The laser scanner generates a source of coherent light and illuminates the workpiece as has been described above. An optical head, having two separate, spaced apart viewing apertures, views the workpiece to produce dual images of the workpiece. Within the optical head, dual images are formed and viewed by the image orthicon and a pair of reference pulses are produced on each scan line which pulses correspond to the points at which the scan line intersects the plane of coherent light impinging upon and illuminating the workpiece. The result is a pair of reference pulse lines such as those shown on the video imager in FIG. 2. As has been described, one or more video digitizers again sample and digitize each scan line, including both of the reference pulses. The subsequent digitized information is again used to determine with great accuracy the location of the centroid or geometric mean of the pulses and this information is used in conjunction with known and calculated parameters to determine the spatial coordinates of the workpiece in a manner similar to that to be described hereafter with respect to the apparatus of FIG. 1.

It should be understood that the video imagers shown in both FIGS. 1 and 2 do not form part of the apparatus for practicing the present invention but merely illustrate the forms of the electronic signals upon which the video digitizer operates if visualized.

Referring again to FIG. 1, the laser 10 is shown separate and apart from the remaining elements of the apparatus and need have no hardware interface with the remaining elements of the present invention except possibly when used with an angle sensor for the laser beam to calculate the X coordinate in swept laser applications. The laser positioned above the workpiece generates a point source of coherent light which is converted into a plane of coherent light by an optical attachment 12 of known type associated with the output of the laser. It will be understood that other types of light sources may be used in the practice of this invention but that use of a laser is preferred due to the reduction of the scattering effects of ambient light. The plane of coherent light is directed at, and illuminates, the workpiece 14 whose spatial coordinates are to be determined. As illustrated, the workpiece is shown on a portion of a conveyor 16 or the like. In the preferred embodiment, the laser 10 is non-movable, but in an alternate embodiment of the present invention, the laser may be mounted so as to scan the workpiece in a side-to-side fashion.

The lens of the opto-electronic device 18 associated with the apparatus of FIG. 1 is of a conventional type selected to obtain a usable field of view of the workpiece and thus may be varied depending upon the job being performed. While not shown, a laser interference filter is mounted between the lens and the opto-electronic device to filter out ambient light. Dual optical head 20 of FIG. 2 comprises a binocular lens system, again selected to obtain a usable field of view.

The opto-electronic device of FIG. 1 may be a standard closed circuit television camera generating a plurality of scan lines per raster in a left to right sweep pattern. The camera can be either a high or a low resolution camera with high or low light sensing capabilities as needed for the particular work situation. Each scan line includes a reference pulse corresponding to the point at which the scan line intersects the plane of coherent light illuminating the workpiece to produce an output of the type illustrated on the video imager in FIG. 1.

The video digitizer 22, shown as a labeled box in FIGS. 1 and 2 and in detail in FIG. 3, is in communication with the output of the opto-electronic device 18 and, in general, samples and digitizes the analog output signal produced by it. After each sweep line from the image orthicon has been sampled, digital logic circuitry within the video digitizer is used to determine the geometric means or centroid of each reference pulse in a manner to be described below. The output of the video digitizer is used by a computer 24 shown schematically in FIG. 1 as a plurality of boxes labeled with the various key functions performed by the computer. The computer takes the video digitizer output and linearizes it, that is, it mathematically compensates for the nonlinearity of the laser line, camera lens, and camera electronics. It will be understood that this function is likely necessary only when the camera system used produces a nonlinear image which will affect results. The use of high quality camera and laser lenses may avoid the need for linearization while the use of very low quality lenses may effectively prevent correction.

The digitizer output signals are then combined with calibration parameters to calculate the spatial coordinates of the workpiece. The calibration parameters are first calculated by electronically viewing and scanning the image of the intersection of the light source with a precisely formed jig, selecting scanned points along planar surfaces of the jig and forming intersecting lines through those points. The intersections of the lines thus formed define the corners of a geometric figure inherent to the jig, such as a triangle, and the dimensions, such as the base and height, are stored within the computer. By combining the geometric figure formed by scanning the jig with the stored dimensions of the figure, calibration parameters are calculated to accurately fixed points thereafter scanned on a workpiece as will be described hereafter. The calibration parameters may be determined intermittently between calculations of the spatial coordinates of the workpiece.

A significant advantage and improvement provided by the present invention arises due to the vastly improved accuracy with which the present equipment allows the location of the reference pulse to be determined. Typical video signal bandwidths, such as those used in television broadcasting, allow for a horizontal resolution of approximately 300–500 picture elements. The present apparatus and method offers much higher resolution with potential usable resolution of one part in 20,000 up to one part in more than one million.

As stated heretofore, the centroid or geometric mean of a reference pulse produced by the opto-electronic device is determined by use of one of two methods. One, a pulse integration technique comprising the steps of integrating the pulse area and then finding the point which divides the pulse area into equal laterally extending portions; or two, a centroid technique comprising the steps of singly and doubly integrating the samples representative of the pulse, i.e., summing all samples representative of the pulse for the single integration and summing all intermediate sums of the single integration for the double integration, dividing the value obtained by the double integration by the value obtained by the single integration to arrive at an offset which is substracted from the location of the last pulse sample to arrive at the centroid of the pulse. In the present system, the computer portion of the equipment provides a predetermined threshold to the digitizer to fix the limits of integration of the pulse. The video digitizer samples the video signal and generates digital signals representative of the magnitude of the samples.

In the first method, the pulse integration technique, all pulse amplitude samples are saved since they are or may be required for the pulse integration process in accordance with the present invention. In both methods, the use of linear interpolation, or possibly polynomial or curvilinear interpolation, allows the pulse mean to be fixed to any reasonably desired precision with the primary limitation being the resolution of the amplitude measurement and the number of samples taken. Either method can be implemented using either analog circuitry, a bit-slice processor, a processor algorithm embodied in software, or digital circuitry; however, the digital circuitry implementation appears to be the most practical solution to the problem at the present time.

Referring to FIG. 3, a block diagram of the first pulse integration method performed by the video digitizer 22 is disclosed. The video signal is fed to a preamplifier section 302 which conditions and buffers the incoming signal for the video analog to digital (A/D) converter 304. Derived also from this incoming signal is the sync pulse at the start of each line of video as well as the frame (blanking) pulse at the beginning (top) of the screen which are derived respectively by a sync detect circuit 306 and a frame detect circuit 308. These pulses are fed to the computer 24 so it can determine line numbers ($\rho$) scanned by the camera 18. An oscillator 310 receives and is synchronized to the sync pulses generated by the sync detector 306 so that the oscillator output signal can then be used for all of the video signal sampling as well as the logic timing within the video digitizer 22.

The A/D converter 304 samples the buffered video signal from the video preamplifier 302 and converts the video samples into binary (digital) data. The video digitizer 22 has two modes of operation: (1) scan and (2) search. In the scan mode, the digitizer samples, sums and stores each sample after a sample has exceeded a threshold set by the computer 24. The system continues sampling and both summing (integrating) and storing each sample until the pulse drops below the set threshold. As the samples are taken, a counter 322 counts (N) pulses from the oscillator 310. The counted pulses from the oscillator 310 and thus the count N contained in the counter 322 corresponds to a coarse location along a given raster scan line at which the corresponding sample was taken. This coarse location N (COARSE COUNT N) is made more precise by a subsequently obtained fractional correction factor described below.

After the summation, all summed samples have been stored in a random access memory (RAM) 314 and the adder circuit 316 and associated output register 317 contain the accumulated sum ($\Sigma$) of all the pulse samples, i.e., all samples representative of the pulse. During the scan mode, the sign of sample values added in the adder circuit 316 is inverted so that the accumulated sum in the register 317 is negative.

After summation of all pulse samples, the system switches into search mode. In the search mode, the value of each stored pulse sample is doubled and added to the sum contained in the adder 316. Sign inversion in the scan mode and sample doubling in the search mode are performed by a scaler circuit 318 under the control of a video pulse detector 320. Each time a doubled sample value is added to the accumulating sum in the adder 316, the sign bit of the sum in the register 317 is tested by search control logic circuitry 324. If the sign bit of the sum is positive, three values are stored: the N count contained in the counter 322 is stored in the COARSE N register 326; the last RAM sample value ($\Delta = A$) which was doubled (2A) and added to the sum is stored in the last sample register 328 as the value 2A; and the positive number remaining in the adder, i.e., the adder residue $\Sigma$ (Residual), is stored in the residue register 330. These three numbers are then used to generate the geometric mean $\eta$ of each scan pulse by utilization of the equation:

$$\eta = N + \frac{\Sigma \text{ (Residual)}}{2A}$$

Between the scan and search modes, the total sum of all pulse samples, i.e., the pulse area, from the register 317 is stored in the pulse area register 332.

Considering the pulse integration technique in greater detail, by setting the limits of the A/D converter 304 to utilize the full range of digital output signals which can be generated by the A/D converter, maximum resolution is obtained from the particular A/D converter selected for use in the digitizer.

After the pulse threshold has been established and the video digitizer samples and digitizes the output of the image orthicon, the digitized values are added together to form a sum arbitrarily made negative. When all samples representative of the pulse have been negatively summed in the adder 316 and individually stored in the RAM 314, the samples are consecutively retrieved from the RAM 314, doubled and added to the negative sum in the adder 316.

The consecutive retrieval can be initiated with the first or last sample representative of the pulse and progress respectively in the order in which the samples were stored or in the inverse of that order. The doubling of the samples and the addition of the doubled values to the sum in the adder 316 continues until the sum in the adder is positive, i.e., the sum $2\Sigma'$ of the doubled samples exceeds the total sum $\Sigma$ of the samples.

Once the sum in the adder 316 is positive, it is known that the sample which was last added is within one sample of the centroid or geometric mean of the pulse. Thus, the corresponding number stored in the N counter (COARSE N) is taken as the base sample for determination of the geometric mean. It is noted that the N counter was either counted down if sample doubling and addition started at the last sample representative of the pulse; or the N counter was reset to the N value of the first sample representative of the pulse and counted up if the doubling and addition sequence started at the first sample representative of the pulse. An interpolation factor in the form of a fractional shift of the location corresponding to the base sample, i.e., the count in the N counter, is calculated by using the residue Σ(Residual) in the adder 316 and the magnitude A of the last sample which was doubled to 2A and added to the sum in the adder. The Σ(Residual) is divided by twice the sample magnitude or 2A to arrive at the fractional shift. Thus, the center or geometric mean of the pulse is:

$$\eta = N - \frac{\Sigma(\text{Residual})}{2A}$$

The fractional shift or interpolation factor Σ(Residual)/2A is added to N if the double summing started at the first sample of the pulse and is subtracted from N if the double summing started at the last sample of the pulse.

The fractional shift of the base sample, COARSE N, to arrive at the geometric means is clarified by noting that the Σ(Residual) corresponds to the portion of the last number added to the adder 316, i.e., twice the magnitude of the last sample, by which that addition caused the sum to exceed the geometric mean. Thus, by adding the fractional portion Σ(Residual)/2A of a step of the N counter to the last sample location, the geometric mean as defined herein is precisely located. The quantization resolution is M×2A' where M is the number of samples comprising a raster line and A' represents the number of available levels of the sample magnitude. For an 8 bit A/D converter, the maximum digital representation of a sample is equal to 256 different states or magnitude levels. Thus, for an 8 bit A/D converter and a 30 Mhz sample rate, (M=1700); $MX2A' = 8.70 \times 10^5$.

Figure 12:
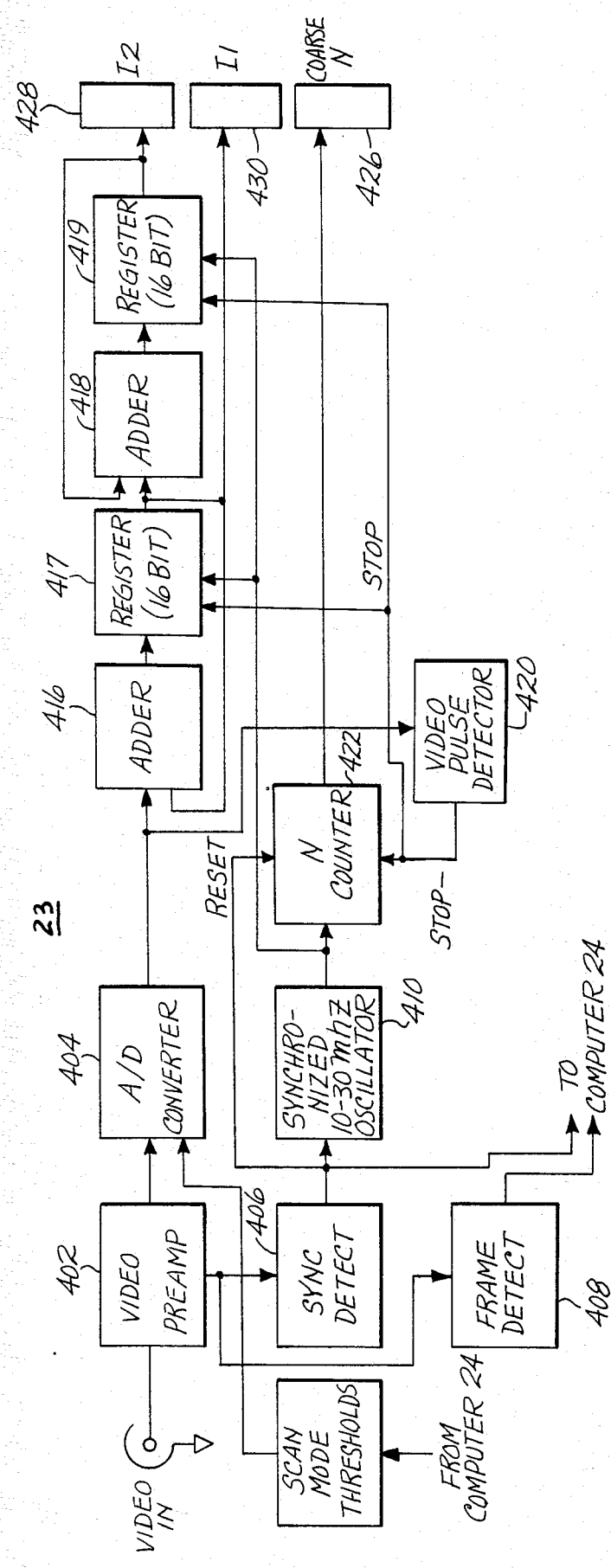
FIG. 12 is a block diagram of an alternate preferred form of video digitizer usable in the present invention.

Referring now to FIG. 12, a block diagram of the centroid technique performed by video digitizer 23, which may be substituted for video digitizer 22, is disclosed. As in the earlier described pulse integration method, a video signal is fed to a preamplifier section 402 which conditions and buffers the incoming signal for the A/D converter 404. Derived also from this incoming signal is the sync pulse at the start of each line of video as well as the frame (blanking) pulse at the beginning (top) of the screen. These are derived respectively by a sync detect circuit 406 and a frame detect circuit 408. These pulses are fed to the computer 24 so it can determine line numbers (ρ) scanned by the opto-electronic device 18. An oscillator 410 receives and is synchronized to the sync pulses generated by the sync detector 406 so that the oscillator output signal can then be used for all of the video signal sampling as well as the logic timing within the video digitizer 23.

The A/D converter 404 samples the buffered video signal from the video preamplifier 402 and converts the video samples into binary (digital) data. The adder circuit 416 sums each sample which is taken after a sample has exceeded a threshold set by the computer 24. The system continues sampling and summing (integrating) each sample until a sample drops below the set threshold. A second sum is generated by the adder circuit 418 from the successive intermediate sums formed by the adder circuit 416.

As the samples are taken, a counter 422 counts pulses from the oscillator 410. Each pulse from the oscillator 410 and thus the count N contained in the counter 422 corresponds to a video sample. The N counts or numbers contained in the counter 422 also define the location along a given raster scan line at which the corresponding sample was taken. Again, higher precision and resolution are obtained if higher oscillator frequencies are used.

After all samples representative of a pulse have been received, the sum of those samples is stored in the first adder circuit 416. The associated output register 417 contains a first sum representing the accumulated sum (Σ) of all the pulse samples, i.e., all samples representative of the pulse from a first sample to a last sample. The second adder 418 and its associate output register 419 contain a second sum representing the sum of the intermediate sums of the pulse samples, thus providing the double or successive integral of the pulse samples. After the summation of all pulse samples, the summing and counting sequence is halted. Three values are stored: the N count contained in the counter 422 is stored in the COARSE N register 426; the value in the second integrating register 419 is stored in the I2 register 428; and the value in the first integrating register 417 is stored in the I1 register 430. These three numbers are then used to generate the centroid η of each scan pulse by utilization of the equation:

$$\eta = N - (I2/I1),$$

wherein the factor I2/I1 is the above-mentioned second sum divided by the first sum and represents an amount prior to the last sample at the coarse count N, at which the centroid is located.

In the present device, an in other devices which require precise location of a pulse, the classic centroid equation can be used. The continuous form of the centroid equation for a pulse with the amplitude function f(t) is:

$$C = \frac{\int_0^T t f(t)}{\int_0^T f(t)}$$

In a discrete system, the analog to the above equation is:

$$C = \frac{\sum_{i=0}^{N} i f_i}{\sum_{i=0}^{N} f_i}$$

This approach has been found to produce results significantly superior to the previously described pulse integration technique for pulses with relatively few samples. The only problem with using this technique stems from the difficulty of generating the $if_i$ product term with the same speed and economy provided by the pulse integration technique. This problem has been solved by reformulating the centroid equation such that multiplication operations are avoided, thus providing significant savings in both speed and costs. The manner of this reformulation will now be described with reference to the array of data disclosed in FIG. 13. This array has three characteristics:

(1) The sum of all array members is:

$$(n+1) \sum_{i=0}^{n} f_i$$

(2) The sum of all the terms under the diagonal is:

$$\sum_{i=0}^{n} if_i$$

(3) The sum of all the terms above the diagonal is:

$$\sum_{i=0}^{n} \sum_{j=0}^{i} f_j$$

Thus:

$$(n + 1) \sum_{i=0}^{n} f_i = \sum_{i=0}^{n} if_i + \sum_{i=0}^{n} \sum_{j=0}^{i} f_j$$

Or, $$\sum_{i=0}^{n} if_i = (n + 1) \sum_{i=0}^{n} f_i - \sum_{i=0}^{n} \sum_{j=0}^{i} f_j$$

Thus, the centroid equation can be rewritten as follows:

$$C = \frac{\sum_{i=0}^{n} if_i}{\sum_{i=0}^{n} f_i} = (n + 1) - \frac{\sum_{i=0}^{n} \sum_{j=0}^{i} f_j}{\sum_{i=0}^{n} f_i}$$

Figure 13:
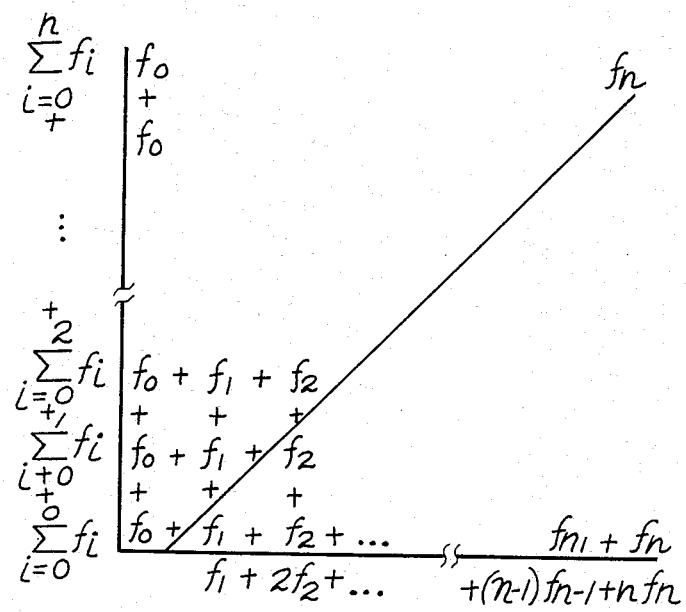
FIG. 13 is a chart showing an array of data representative of a digitized pulse.

The calculation $$\sum_{i=0}^{n} f_i$$

is performed, summing samples across the pulse, and thus each term of the portion of the array in FIG. 13 above the diagonal is available from the first adder 417 which is stored in the I1 register 430. These, then, need only be summed to arrive at the $$\sum_{i=0}^{n} \sum_{j=0}^{i} f_j$$

terms, which terms are available from the second adder 419 stored in the I2 register 428. Thus, two relatively inexpensive adders can provide all of the on-line, sample to sample, calculation. The terms $$\sum_{i=0}^{n} \sum_{j=0}^{i} f_j \text{ and } \sum_{i=0}^{n} f_i$$

can then be divided after the sample interval to arrive at the pulse centroid.

Once the geometric mean or centroid of each reference pulse is determined to the desired degree of resolution using one or the other of the above-described techniques, the computer portion of the equipment relates this mean to known parameters such as the distance from the optical head to the jig to calculate the spatial coordinates of the workpiece.

In determining the necessary parameters for calibration, a precisely formed jig 900 such as one of those shown in FIGS. 4 through 11 is used as a calculating reference base rather than stored spatial coordinates as has been used by the prior art. Scanned image lines form reference pulse centers 901 along planar surfaces of a jig are selected and straight lines 902 are constructed through these selected scanned points (pulse centers 901) as shown in FIGS. 8-11. The intersection points 904 of the lines thus constructed define corners of a geometric figure such as triangle 905 shown in FIGS. 9 and 10. Appropriate dimensions of the figure thus constructed, e.g., the base and height of the triangle, are stored in the computer. It is noted that the spatial coordinates of the corner points 904 are not known by the computer and that the corner points need not and, in the preferred form of the jig, do not lie upon the surface of the jig as seen in FIGS. 8 through 11.

Figure 9:
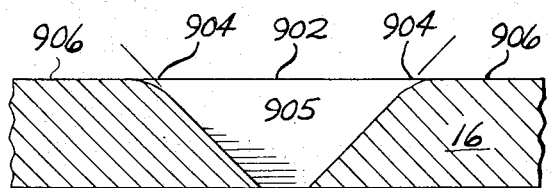
FIG. 9 is a sectional view of the preferred calibration jig of FIG. 8 taken aong the line 9—9 of FIG. 8.
Figure 8:
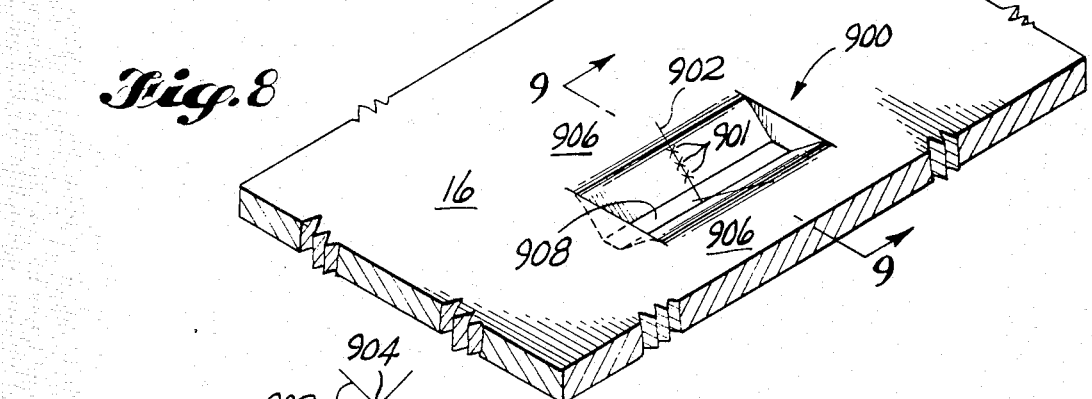
FIG. 8 is a perspective view of a preferred calibration jig formed into the workpiece support surface.
Figure 10:
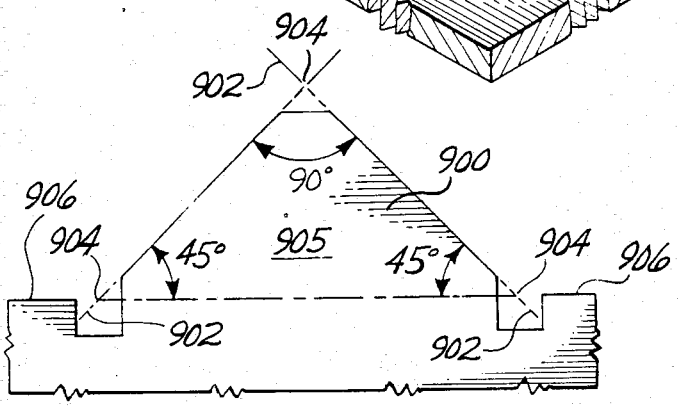
FIG. 10 is a side view of a modified version of the jig of FIG. 6.
Figure 11:
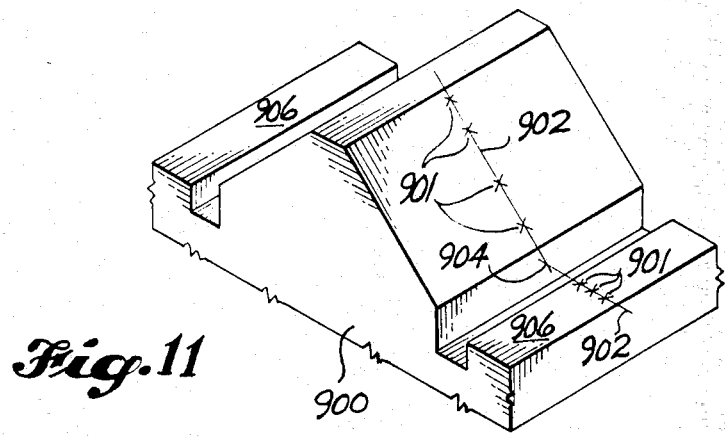
FIG. 11 is a perspective view of the jig of FIG. 10.

The jig 900 shown in FIGS. 8 and 9 is the preferred form of jig because of its low cost, ease of formation and self-cleaning nature. The slot 908 formed in the jig 900 of FIGS. 8 and 9 permits sawdust, small wood chips and other debris to fall through the jig so that the planar surfaces to be scanned tend to remain cleaner than with other jig forms. Further, the jig 900 of FIGS. 8 and 9 can be easily and cheaply formed into the workpiece supporting surface, i.e., the upper surface of the conveyor 16 as disclosed, so as to be located completely below the planar surface of workpiece support conveyor 16; without obstructing the surface with the self-cleaning open slot 901 extending through the support. Such formation into the workpiece support surface also insures highly accurate location of the jig relative to the workpiece support to simplify calculations and improve accuracy.

The geometric figure inherent to the jig and constructed by the computer from information obtained by scanning the jig is compared to the dimensions of the figure stored in the computer. One of the corner points of the geometric figure is established as a 0,0,0 point or origin of a three-dimensional coordinate system. The position of the coordinate system origin, i.e., the selected corner point, relative to the conveyor 16 is determined and passed to the computer 24 to accurately locate points on the surface of the workpiece in the coordinate system. Of course, if the jig is formed into the surface of the workpiece support, e.g., the conveyor 16, this position is fixed and preprogrammed into the computer. One or more other corner points of the geometric figure are defined in the coordinate system. These defined points in the coordinate system, including the origin, permit the calculation of calibration parameters set out in equations hereafter.

In this unique way, the accuracy of the present equipment is significantly improved as compared to prior equipments which necessarily are limited in resolution power to stored spatial coordinates of a jig. In accordance with the present invention, regardless of where the optical scanner is aimed, so long as a jig is in the field of view of the camera, calibration will be consistent. It is suggested that the longitudinal axis of the jig be aligned with the longitudinal axis of the conveyor 16 to simplify calculation of the spatial coordinates of the workpiece, however, such alignment is not necessary.

The calibration technique is employed to calculate four parameters for the (YZ) calculation. The equations for calculation of the Y and Z spatial coordinates of points on the workpiece are:

$$Z = Z_0 \left( \frac{\eta - \eta_0}{\eta - \eta_\infty} \right)$$

$$Y = K_1 (\rho - \rho') (Z_0 - Z) - K_2$$

And the calculation of the X spatial coordinate is:

$$X = Z \tan \beta$$

Where $\eta 0$, $\eta_\infty$, $K_1$, $K_2$ and $\rho'$ are parameters calculated during calibration, $\eta$ and $\rho$ are the parameters passed to the computer by the digitizer, $Z_0$ is a constant known distance from the camera to the calibration jig and $\beta$ is the known angle of the laser to the camera. By using the stored dimensions of the geometric figure of a precisely formed calibration jig and the video digitizer find centers of reference pulses representing to sample data points on planar surfaces of the jig, defined points in a three-dimensional coordinate system can be determined as previously described. The four parameters ($\eta 0$, $n_\infty$, $K_1$, and $K_2$) can be determined with excellent accuracy by inverting the above equations and utilizing the known locations of the corner points of the geometric figure to solve the inverted equations for the parameters.

Figure 5:
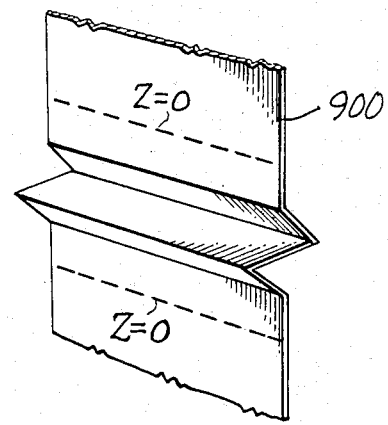
FIG. 5 is a perspective view of the jig of FIG. 4.
Figure 6:
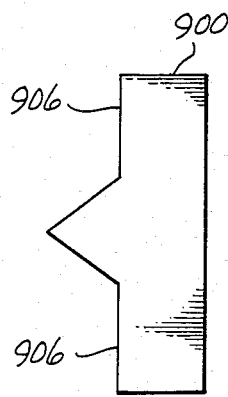
FIG. 6 is a side view of another embodiment of a calibration jig usable in the present invention.
Figure 7:
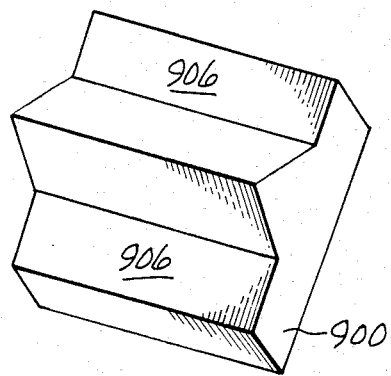
FIG. 7 is a perspective view of the jig of FIG. 6.

Referring to FIGS. 8 through 11, in use, the computer is instructed as to locations of Z=zero portions 906 of the jigs shown (also shown by dashed lines in the jig of FIG. 5). This allows the system to choose sample points on the planar surfaces of the jig. Two or more sample points 901 are selected at locations on planar surfaces of the jig, i.e., locations other than where the planar surfaces intersect, and lines 902 are constructed through these points by the computer. The intersections 904 of the lines 902 constructed through the selected points 901 are determined and compared to stored dimensions of the specific geometric figure formed by visualizing those points as the corner points of the figure. A coordinate system is established based on one of the corner points and the remaining corner points are accurately defined within the coordinate system. These known points in the coordinate system, including the origin of the coordinate system are then used to calculate $\eta_0$, $n_\infty$, $K_1$ and $K_2$ by inverting the Y and Z equations set forth above and solving the resulting equations simultaneously. In this way, the present invention is calibrated without storing the spatial coordinates of points on a jig surface. The four parameters can be determined periodically or on a continuing basis in the manner discussed above.

A novel and unique method and apparatus for determining the location of a workpiece with speed and accuracy not heretofore known has thus been disclosed. It will be apparent to those skilled in the art to which this invention is addressed, however, that the present invention may be embodied in forms or embodiments other than that specifically disclosed above without departing from the spirit or essential characteristics of the invention. The particular embodiment of the high speed scanning apparatus described above is therefore to be considered in all respects as illustrative and not restrictive and the scope of the present invention is set forth in the appended claims rather than being limited by the examples set forth in the foregoing description.

What is claimed is:

1. A method for determining spatial coordinates of a workpiece, comprising the steps of:
   (a) illuminating said workpiece and a jig with a planar source of light, said jig inherently defining a geometric figure;
   (b) storing the dimensions of the geometric figure inherent in said jig;
   (c) electronically viewing the intersections of the planar source of light and said workpiece and jig from a location spaced apart from said workpiece, jig and source of light, said viewing location being at a known distance from said jig, and at a known angle relative to said planar source of light;
   (d) scanning electronic images formed by said electronic viewing along a plurality of horizontal lines, each line including a reference pulse corresponding to the point at which the planar light intersects and illuminates said workpiece or jig;
   (e) determining the centroid of the reference pulse on selected scan lines;
   (f) calculating calibration parameters using the geometric figure inherent in said jig; and
   (g) calculating the spatial coordinates of the workpiece using the centroid of the reference pulses, said calibration parameters, and the known distance from the viewing point to the jig.

2. The method of claim 1, wherein the steps of electronically viewing the intersection of the planar source of light and the jig, scanning the images formed, and calculating calibration parameters are carried out prior to the step of electronically viewing the intersection of the planar light source and the workpiece.

3. The method of claim 1, wherein the step of calculating calibration parameters is carried out only intermittently between the calculation of the spatial coordinates of a plurality of workpieces.

4. The method of claim 1, including the additional step of employing the calculated workpiece spatial coordinates to direct other equipment to operate upon the workpiece.

5. The method of claim 1, wherein the step of scanning the electronic images formed by electronically viewing the intersections of the planar source of light and the workpiece and jig includes the steps of sampling the magnitude of said electronic images and digitizing the values of said samples.

6. The method of claim 5, wherein the step of determining the centroid of the reference pulse comprises the steps of:
   integrating said pulse from a first sample to a last sample to produce a first sum;
   successively integrating said first sum to produce a second sum; and
   dividing said second sum by said first sum to produce a number representative of the number of samples prior to said last sample at which the centroid is located.

7. A method for determining spatial coordinates of a workpiece, comprising the steps of:
   (a) illuminating said workpiece and a jig with a planar source of light, said jig inherently defining a geometric figure;
   (b) storing the dimensions of the geometric figure inherent in said jig;
   (c) electronically viewing the intersections of the planar source of light and said workpiece and jig from a location spaced apart from said workpiece, jig and source of light, said viewing location being at a known distance from said jig, and at a known angle relative to said planar source of light;
   (d) scanning electronic images formed by said electronic viewing along a plurality of horizontal lines, each line including a reference pulse corresponding to the point at which the planar light intersects and illuminates said workpiece or jig;
   (e) determining the geometric mean of the reference pulse on selected scan lines;

(f) calculating calibration parameters using the geometric figure inherent in said jig; and
(g) calculating the spatial coordinates of the workpiece using the geometric means of the reference pulses, said calibration parameters, and the known distance from the viewing point to the jig.

8. The method of claim 7, wherein the steps of electronically viewing the intersection of the planar source of light and the jig, scanning the images formed, and calculating the calibration parameters are carried out prior to the step of electronically viewing the intersection of the planar light source and the workpiece.

9. The method of claim 8, wherein the step of calculating calibration parameters is carried out only intermittently between the calculation of the spatial coordinates of a plurality of workpieces.

10. The method of claim 7, including the additional step of employing the calculated workpiece spatial coordinates to direct other equipment to operate upon the workpiece.

11. The method of claim 7, wherein the step of scanning the electronic images formed by electronically viewing the intersections of the planar source of light and the workpiece and jig includes the steps of sampling the magnitude of said electronic images and digitizing the values of said samples obtained.

12. The method of claim 11, wherein the step of determining the geometric mean of the reference pulse on selected scan lines comprises the steps of:
(a) summing said sample values to effectively integrate the amplitude area beneath each pulse;
(b) locating a base pulse amplitude sample which when doubled and added to the doubled values of the preceding samples equals or exceeds the sum of all pulse amplitude samples;
(c) determining an interpolation factor by calculating the ratio of the amount by which the sum of all pulse amplitude samples was exceeded in the step locating said base pulse amplitude sample to twice the amplitude of said base pulse amplitude sample; and
(d) interpolating said base pulse amplitude sample by adding said interpolation factor to said base pulse amplitude sample to determine the geometric mean of said pulse.

13. The method of claim 11, wherein the step of determining the geometric mean of the reference pulse on selected scan lines comprises the steps of:
(a) summing said sample values to effectively integrate the amplitude area beneath each pulse;
(b) locating a base pulse amplitude sample which when doubled and added to the doubled values of the succeeding samples equals or exceeds the sum of all pulse amplitude samples;
(c) determining an interpolation factor by calculating the ratio of the amount by which the sum of all pulse amplitude samples was exceeded to twice the amplitude of said base pulse amplitude sample; and
(d) interpolating said base pulse amplitude sample by subtracting said interpolation factor from said base pulse amplitude sample to determine the geometric mean of said pulse.

14. A method of determining the spatial coordinates of a workpiece, comprising the steps of:
(a) illuminating a jig with a planar source of light, said jig inherently defining a geometric figure;
(b) storing the dimensions of said geometric figure;
(c) determining calibration parameters by:
(1) electronically viewing the intersection of the planar source of light and the jig from a known distance, and at a known angle relative to said planar source of light;
(2) scanning the electronic image formed by said electronic viewing to produce scan lines having reference pulses corresponding to the intersection of the planar light source and the jig;
(3) determining the centers of the reference pulses; and,
(4) using the stored dimensions of said geometric figure and the centers of the reference pulses to calculate calibration parameters;
(d) illuminating the workpiece with a planar source of light;
(e) electronically viewing the intersection of the planar source of light and the workpiece from the same location from which the jig was viewed;
(f) scanning the electronic image formed by said electronic viewing to produce scan lines having reference pulses corresponding to the point at which the planar light illuminates the workpiece;
(g) determining the centers of the reference pulses; and
(h) calculating the spatial coordinates of the workpiece using the centers of the workpiece pulses, said calibration parameters and the known distance from the viewing point to the jig.

15. The method of claim 14, wherein the steps of scanning the electronic images formed by the intersection of the planar source of light and the workpiece and jig includes the steps of scanning along a plurality of horizontal lines, each line including a reference pulse corresponding to the point at which the planar light intersects and illuminates the workpiece or jig.

16. The method of claim 15, wherein the steps of scanning the electronic images formed include the step of digitizing said images.

17. Apparatus for high speed scanning of a workpiece to determine the spatial coordinates thereof, including:
a jig inherently defining a geometric figure;
means for illuminating said workpiece and said jig with a beam of planar light;
opto-electronic means for viewing the intersection points of said beam with said jig and workpiece, said opto-electronic means being located a known distance from said jig, and at a known angle relative to said beam of planar light;
video digitizer means for digitizing the output signals of said opto-electronic means and determining the location of the points of intersection of said beam of light and said jig or workpiece; and
computer means, including means for storing the dimensions of said geometric figure for calculating calibration parameters using the dimensions of said geometric figure and the location of said points of intersection of said beam of light and said jig; and for calculating the spatial coordinates of said workpiece using said calibration parameters, the locations of the intersections of the beam of light with said workpiece and, the known distance of said opto-electronic means from said jig.

18. The apparatus of claim 17, wherein said video digitizer is embodied in digitial circuitry.

19. The apparatus of claim 17, including an optical head having binocular viewing apertures providing a pair of images to said image orthicon.

20. The apparatus of claim 17, wherein said workpiece is supported on a generally planar surface and said jig is formed into said planar surface.

21. The apparatus of claim 17, wherein said opto-electronic device is located at a known angle relative to the plane of said planar light.

22. The apparatus of claim 20, wherein said jig is formed completely below said planar surface and includes an open slot extending through the support for said workpiece whereby said jig tends to be self-cleaning.

23. The apparatus of claim 22, wherein said planar surface comprises the upper surface of a conveyor for carrying said workpiece.

24. A method for determining spatial coordinates of a workpiece, wherein the workpiece is illuminated by a planar source of light and the intersection of the planar source of light with the workpiece is viewed by an opto-electronic device which generates electronic signals and is positioned at a defined distance from said workpiece and at a known angle relative to said planar source of light, said method comprising the steps of:
   (a) placing a precisely shaped jig within the illumination area of said source of planar light and within the field of view of said opto-electronic device, said jig inherently defining a geometric figure;
   (b) storing the dimensions of said geometric figure inherently defined by said jig;
   (c) processing the electronic signals generated by said opto-electronic device to determine the points of intersection of said planar source of light with said jig;
   (d) selecting a plurality of points corresponding to the incidence of said planar source of light upon planar surfaces of said jig;
   (e) interconnecting said selected points by straight lines intersecting one another with the points of intersection of said straight lines defining the corners of said geometric figure inherent in said jig;
   (f) defining a coordinate system based on the points of intersection of said lines;
   (g) defining the points of intersection of said lines in said coordinate system;
   (h) calculating calibration parameters based on said points of intersection defined in said coordinate system;
   (i) generating reference points corresponding to the incidence of said planar source of light upon said workpiece; and
   (j) calculating the position of said reference points in said coordinate system by application of said calibration parameters in X, Y and Z equations whereby spatial coordinates of points on the surface of said workpiece are determined.

25. A method for determining spatial coordinates of a workpiece, wherein the workpiece is illuminated by a planar source of light and the intersection of the planar source of light with the workpiece is viewed by an opto-electronic device which generates electronic signals and is effectively positioned at a defined angle relative to said source of light and at a defined distance from said workpiece, said method comprising the steps of
   (a) illuminating a precisely shaped jig with said planar source of light, said jig inherently defining a geometric figure having corner points;
   (b) storing the dimensions of said geometric figure inherently defined by said jig;
   (c) scanning said jig with said opto-electronic device;
   (d) determining reference points of intersection of said planar light with said jig;
   (e) processing said reference points to identify said geometric figure corner points;
   (f) defining a coordinate system based on said corner points;
   (g) locating said corner points in said coordinate system;
   (h) calculating calibration parameters based on the locations of said corner points in said coordinate system;
   (i) scanning said workpiece with said opto-electronic device;
   (j) determining reference points of intersection of said planar light with said workpiece; and
   (k) calculating the locations of said reference points on said workpiece in said coordinate system using said calibration parameters.

26. The method of claim 25, wherein step (e) comprises the following steps:
   (l) selecting points where said light intersects planar surfaces of said jig; and
   (m) interconnecting points selected in step (a) with lines which intersect to locate said corner points of said geometric figure.

27. The method of claim 26, wherein steps (c) and (i) each comprise the steps of:
   (n) sampling the magnitude of signals generated by said opto-electronic device; and
   (o) digitizing the values of samples obtained in step (n); and
   steps (d) and (j) each comprise the steps of:
   (p) locating a base pulse amplitude sample which when doubled and added to the doubled values of the preceding samples equals or exceeds the sum of all pulse amplitude samples;
   (q) determining an interpolation factor by calculating the ratio of the amount by which the sum of all pulse amplitude samples was exceeded in step (p) to twice the amplitude of said base pulse amplitude sample; and
   (r) interpolating said base pulse amplitude sample by adding said interpolation factor to said base pulse amplitude sample to determine the geometric mean of said pulse.

28. The method of claim 26, wherein steps (c) and (i) each comprise the steps of:
   (n) sampling the magnitude of signals generated by said opto-electronic device; and
   (o) digitizing the values of samples obtained in step (n); and
   steps (d) and (j) each comprise the steps of:
   (p) locating a base pulse amplitude sample which when doubled and added to the doubled values of the succeeding samples equals or exceeds the sum of all pulse amplitude samples;
   (q) determining an interpolation factor by calculating the ratio of the amount by which the sum of all pulse amplitude samples was exceeded in step (p) to twice the amplitude of said base pulse amplitude sample; and
   (r) interpolating said base pulse amplitude sample by subtracting said interpolation factor from said base pulse amplitude sample to determine the geometric mean of said pulse.

* * * * *

UNITED STATES PATENT AND TRADEMARK OFFICE
CERTIFICATE OF CORRECTION

PATENT NO. : 4,498,778
DATED : February 12, 1985
INVENTOR(S) : Steven James White It is certified that error appears in the above-identified patent and that said Letters Patent is hereby corrected as shown below:

Column 2, line 60: "substracting" should be —subtracting—.

Column 4, line 21: "aong" should be —along— .

Column 10, line 27: "an" should be —and—.

Column 10, line 35:

" $$C = \frac{o^T \, tf(t)}{o^T \, f(t)}$$ "

should be:

— $$C = \frac{\int_o^T tf(t)}{\int_o^T f(t)}$$ —

Column 13, line 5: Insert —equal to the— after "constant".

Column 13, line 9: Insert —to— after "digitizer".

Column 13, line 10: Delete "to" after "representing".

Signed and Sealed this

Thirtieth Day of July 1985

[SEAL]

Attest:

DONALD J. QUIGG

*Attesting Officer*     *Acting Commissioner of Patents and Trademarks*